April 12, 1960
B. F. STEPHENS
2,932,314
FABRICATED VALVE STRUCTURE FOR AUTOMATIC WATER INJECTORS
Filed June 14, 1956
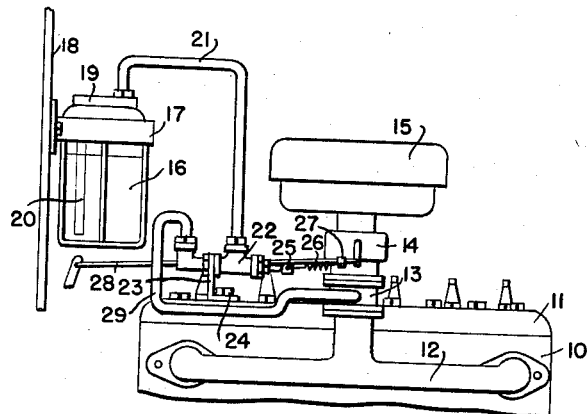
FIG. 1.
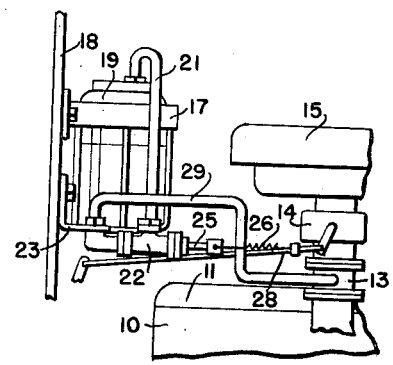
FIG. 2.
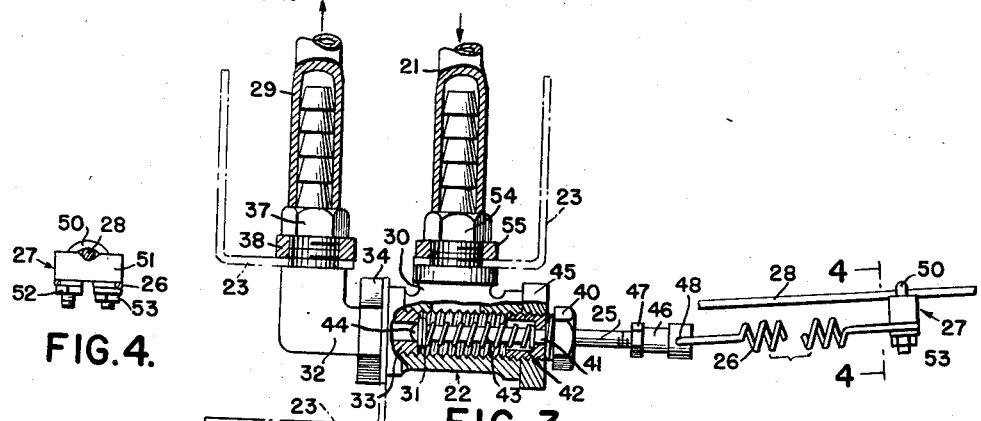
FIG. 4.
FIG. 3.
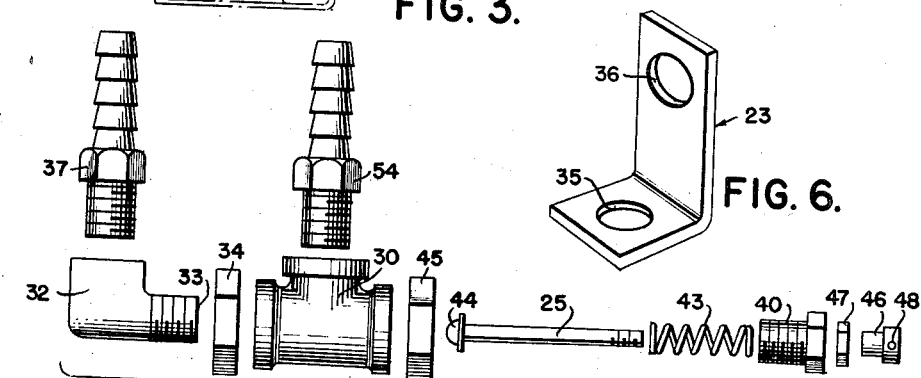
FIG. 6.
FIG. 5.
INVENTOR.
Benjamin F. Stephens
BY
*L. S. Saulsbury*
ATTORNEY United States Patent Office 2,932,314
Patented Apr. 12, 1960

2,932,314
FABRICATED VALVE STRUCTURE FOR AUTOMATIC WATER INJECTORS

Benjamin F. Stephens, Brooklyn, N.Y.

Application June 14, 1956, Serial No. 591,484

1 Claim. (Cl. 137—351)

This invention relates to a fabricated water injector valve for automatically supplying water vapor to internal combustion engines as the engine speed is increased.

It is an object of the present invention to provide a valve which can be fabricated from standard fitting parts and which can be adjusted and adapted to be supported in different ways upon the engine or vehicle dashboard so as to be properly aligned with the carburetor control rod and automatically opened to draw the water into the engine with the mixed gas and air.

It is another object of the invention to provide a valve that is formed of a T-fitting, hose nipples, an elbow, a bushing bolt, a headed bolt slidable through the brushing and serving as a valve element, a spring urging the head of the bolt against the elbow fitting normally to close off the flow of water, and lock nuts for securing the elbow and the bushing bolt in adjusted positions within the T-fitting whereby spring pressure of the headed bolt upon the valve seat may be adjusted.

It is a further object of the invention to provide in a fabricated injector valve formed of standard parts an arrangement by which the supporting or mounting bracket can be connected to the T-fitting at three different locations thereon by the parts themselves and so that the bracket might extend in several directions for connection with the engine bolts or upon bolts that may secure the valve to the dashboard.

Other objects of the invention are to provide a fabricated valve element for use with a water vapor injecting apparatus for internal combustion engines which is of simple construction, has a minimum number of parts, inexpensive to manufacture, requires little machining, easy to assemble, durable, compact, easy to install upon the vehicle and to connect with the carburetor control rod, and effective and efficient in use.

For other objects, and for a better understanding of the invention, reference may be had to the following detailed description taken in connection with the accompanying drawing, in which Figure 1 is an elevational view of the water injecting apparatus employing the fabricated valve of the present invention and of the engine and its carburetor to which the apparatus is connected, the valve being mounted upon the engine, Fig. 2 is an elevational view of the water injection apparatus and of the engine and its carburetor where the valve is mounted upon the dashboard, Fig. 3 is an enlarged elevational view of the fabricated valve connected to the carburetor control rod with a portion of the valve broken away and shown in section and with illustration made of the different ways that the supporting bracket may be connected to the valve, Fig. 4 is an elevational view taken through the carburetor control rod and looking upon the fitting assembly used for connecting the pull spring of the valve to the carburetor control rod, Fig. 5 is an exploded view of the fabricated valve and showing in elevation all of the parts thereof, and Fig. 6 is a perspective view of the mounting bracket.

Referring now particularly to Figs. 1 and 2, there is shown an internal combustion engine 10 having a cylinder head 11, an intake manifold 12 to which a water inlet adaptor 13 is connected. A carburetor 14 with its air inlet filter 15 is mounted on the water inlet adaptor 13. Upon installing the water vapor injecting apparatus upon the engine the carburetor is detached from the manifold and the water inlet adaptor 13 is inserted therebetween.

A glass water supply tank 16 is mounted by means of a bracket holder 17 upon the dashboard 18 of the vehicle. The water tank 16 has a cover 19 from which depends into the bottom of the tank 16 an air inlet pipe 20 and a vapor outlet hose 21 for receiving and conducting the vaporized water to a fabricated control valve 22 constructed according to the present invention. This control valve 22 is mounted by means of an L-shaped bracket 23 upon the engine cylinder head 11 and is secured thereto by a cylinder head bolt 24. A slidable valve element 25 is connected by a tension spring 26 and a fitting 27 to a carburetor control rod 28 so that as the carburetor is opened the valve 22 will be automatically opened to permit the suction of water vapor from the top of the tank 16. This water vapor is delivered from the valve 22 through a hose 29 to the water inlet adaptor 13.

In Fig. 2, it will be seen that the valve 22 is mounted by the same bracket 23 to the dashboard 18, the mounting bracket 23 being secured to the valve at a different location thereon and by the fabricated parts that go to make up the valve. The tension spring 26 connects the valve rod 25 with the carburetor control rod 28 in the same manner by the fitting assembly 27.

The valve 22 has its main body formed of a standard T-fitting 30 that is internally-threaded throughout its length as indicated at 31. Upon this fitting 30 and at one end thereof, there is secured a standard elbow fitting 32 by threaded engagement with the threads 31 of the T-fitting 30 and its inner end serves as a valve seat as indicated at 33. This elbow fitting can be adjusted to different positions within the end of the T-fitting 30 and is locked in place by a lock nut 34 which also may serve to hold the mounting bracket 23 tightly secured to the T-fitting. This mounting bracket has an opening 35 through which the externally threaded end of the elbow fitting extends. The bracket 23 has another opening 36 adapted to receive the attaching bolt for securing the bracket to the engine, the dashboard, or to any other suitable location on the vehicle. One leg of the bracket is preferably longer than the other and the bracket can thus be manipulated or turned depending upon the location where the bracket is to be connected and for the best alignment of the valve with the carburetor control rod. A threaded nipple fitting 37 is secured to the other end of the elbow fitting 32 and to this nipple the pipe hose 21 is attached. This nipple 37 may also serve to secure the bracket 23 to the elbow 32 as illustrated in Fig. 3. A washer 38 is tightened upon the bracket 23 to rigidly secure the bracket between the nipple and the elbow.

Threaded into the opposite end of the T-fitting 22 is a bushing bolt 40 having a hole 41 extending therethrough and which serves to support and guide the slidable valve element 25. This bolt 41 has an enlarged recess 42 in its inner end to accommodate and support a compression spring 43 that surrounds the valve element 25 and engages with a valve seating head 44 on the valve element 25 to urge the seating head against the valve seat 33 on the elbow 32. The spring pressure can be adjusted by turning either the bushing bolt 40 in the end of the T-fitting or the elbow fitting 32. A lock nut 45 secures the bolt 40 in its adjusted position and in the same manner as the lock nut 34 holds the elbow 32 and its seat 33 in its axially adjusted position within the T-fitting. The valve element 25 is in the form of a long small diameter bolt and is thus a standard part. The bolt 40 is also a standard machine bolt and requires only a drilling operation thereupon to provide the hole 41 therein. The lock nuts 34 and 35 are also standard nuts.

The bolt 25 has a terminal end 46 adjustably connected to it and which is held in its adjusted position thereon by a lock nut 47. The terminal end has a small transverse hole 48 through which the end of the pull spring 26 extends. The fitting assembly 27 comprises a U-bolt 50 which extends through a block 51 and is tightened upon the carburetor control rod by nuts 52 and 53 on the legs of the U-bolt and which also serve to secure the end of spring 26 upon the bottom of the block 51.

The hose 21 is connected to the T-fitting 30 by a nipple 54 threaded into the top of the T-fitting. A washer 55 surrounding the nipple 54 retains the bracket 23 on this part of the T-fitting.

It should now be apparent that there has been made a valve formed of standard fittings, nut and bolt parts. Use is made of the inner end of the elbow as the valve seat and the adjustable valve element is an elongated bolt having a head engageable with the seat and lifted therefrom as the carburetor control rod 28 is operated to increase the speed of the engine. As the head 48 of the valve element 25 is lifted from the seat 33, the water vapors are sucked through the valve element 22 and into the manifold 12 along with the fuel and air mixture.

While various changes may be made in the detail construction, it shall be understood that such changes shall be within the spirit and scope of the present invention as defined by the appended claim.

What is claimed is:

A fabricated valve structure comprising a standard T-fitting, a standard elbow fitting secured to one end of the T-fitting and providing an internal valve seat on the end and within the T-fitting, a tandard bushing screw bolt having an opening therethrough and secured to the other end of the T-fitting in axial alignment with the elbow fitting, a standard elongated bolt slidable through the opening in the screw bolt and having a valve head engageable with the seat on the elbow fitting, a valve compression spring surrounding the elongated bolt and reacting between the screw bolt and the head of the elongated bolt, said elbow fitting and screw bolt both being axially adjustable in the T-fitting to vary the pressure of the spring acting upon the bolt head, lock nuts on the elbow fitting and screw bolt to lock the elbow fitting and screw bolt in their respective adjusted positions upon the T-fitting, a terminal end member provided upon the outer end of the elongated bolt to which a pull member may be attached, hose nipples respectively engageable with the T-fitting and the elbow fitting, and a mounting bracket of right angle shape having a hole therein to permit the same to overlie the screw bolt, the diameter of said hole in the bracket being of such size and the bracket may also overlie the elbow, or the nipples and be secured to the T-fitting and elbow fitting by the lock nuts that hold the elbow fitting and the screw bolt in their adjusted positions upon the T-fitting or by the nipples upon the same being tightened upon the T-fitting and the elbow fitting.

References Cited in the file of this patent

UNITED STATES PATENTS

| | | |
|---|---|---|
| 11,673 | Vaughan | June 28, 1898 |
| 820,556 | Cooke | May 15, 1906 |
| 852,819 | Brick | May 7, 1907 |
| 898,377 | Karns | Sept. 8, 1908 |
| 941,713 | Jacobs | Nov. 30, 1909 |
| 1,232,855 | Schoonover | July 10, 1917 |
| 1,370,459 | Lippoldt | Mar. 1, 1921 |
| 1,556,431 | Eberman | Oct. 6, 1925 |
| 1,597,659 | Hoerr | Aug. 24, 1926 |
| 1,882,600 | Hollingshead | Oct. 11, 1932 |
| 2,078,481 | Chanavier | Apr. 27, 1937 |
| 2,628,799 | Aaby | Feb. 17, 1953 |
| 2,732,167 | Stout | Jan. 24, 1956 |

FOREIGN PATENTS

| | | |
|---|---|---|
| 589,625 | France | of 1925 |
| 81,284 | Norway | of 1953 |